United States Patent
Akahori et al.

[11] Patent Number: 5,104,978
[45] Date of Patent: Apr. 14, 1992

[54] MONOAZO RED REACTIVE DYE COMPOUND HAVING A VINYLSULFONE TYPE FIBER REACTIVE GROUP AND A SUBSTITUTED TRIAZINYL GROUP

[75] Inventors: Kingo Akahori, Toyonaka; Masayuki Miki, Ashiya; Takashi Omura, Kobe; Naoki Harada, Suita; Takeshi Washimi, Toyonaka, all of Japan

[73] Assignee: Sumitomo Chemical Company, Limited, Osaka, Japan

[21] Appl. No.: 439,244

[22] Filed: Nov. 20, 1989

[30] Foreign Application Priority Data

Dec. 9, 1988 [JP] Japan .................. 63-312560
Dec. 10, 1988 [JP] Japan .................. 63-312655

[51] Int. Cl.$^5$ ................ C09B 62/51; D06P 1/384
[52] U.S. Cl. ............................... 534/612; 534/605; 534/632
[58] Field of Search .................. 534/605, 612, 642

[56] References Cited

U.S. PATENT DOCUMENTS 4,626,589 12/1986 Omura et al. .................. 534/605

FOREIGN PATENT DOCUMENTS 62-43466 2/1987 Japan .................. 534/605

OTHER PUBLICATIONS

Morimitsu et al., Chemical Abstracts, vol. 107, No. 200383s (1987).

*Primary Examiner*—Mary C. Lee
*Assistant Examiner*—Fiona T. Powers
*Attorney, Agent, or Firm*—Stevens, Davis, Miller & Mosher

[57] ABSTRACT

A monoazo compound represented by the following formula in the free acid form:

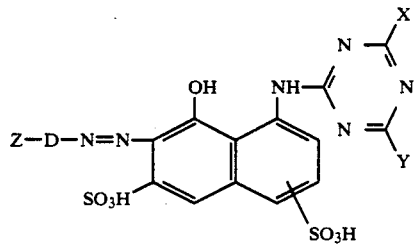

wherein D is unsubstituted or substituted phenylene or naphthylene, X is unsubstituted or substituted pyridinio, Z is $-SO_2CH=CH_2$ or $-SO_2CH_2CH_2L$ in which L is a group capable of being split by the action of an alkali, and Y is $-V-R$ in which V is $-O-$ or $-S-$, and R is hydrogen or which may be substituted alkyl, cyclohexyl, phenyl which may be substituted, naphthyl which may be substituted or benzyl which may be substituted, or

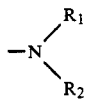

in which $R_1$ and $R_2$ independently of one another are each hydrogen or unsubstituted or substituted alkyl, phenyl, naphthyl or benzyl, which is superior in solubility and useful for dyeing or printing fiber materials such as cellulose to a red color with superior build-up properties.

7 Claims, No Drawings

MONOAZO RED REACTIVE DYE COMPOUND HAVING A VINYLSULFONE TYPE FIBER REACTIVE GROUP AND A SUBSTITUTED TRIAZINYL GROUP

The present invention relates to a monoazo compound, a process for producing the same and a process for dyeing or printing fiber materials therewith.

More specifically, the present invention relates to a monoazo compound having a vinylsulfone type fiber reactive group and a substituted triazinyl group, which is useful for dyeing or printing fiber materials to a red color.

Different kinds of fiber reactive dyes have been extensively used for dyeing or printing fiber materials, particularly those such as cellulose fiber materials. Among them, fiber reactive dyes of the vinylsulfone type are prominent because of their excellent dye performance. However, the dyes of this kind have become insufficient to meet recent consumers' high demand for the dye performance properties such as solubility and build-up or color yield as well as fastness of dyed or printed products.

Many fiber reactive monoazo dyes of this kind useful for dyeing or printing fiber materials a red color are known. For example, in U.S. Pat. No. 3,223,470 is disclosed a reactive dye of the following formula,

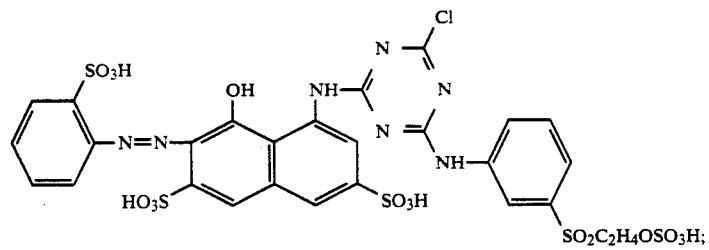

In Published Unexamined Japanese Patent Application (Japanese Kokai) No. 59-115,362 a reactive dye of the following formula is disclosed,

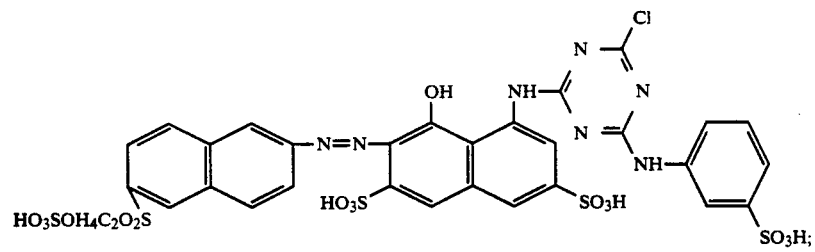

and In Japanese Kokai No. 61-118,459 a reactive dye of the following formula is disclosed,

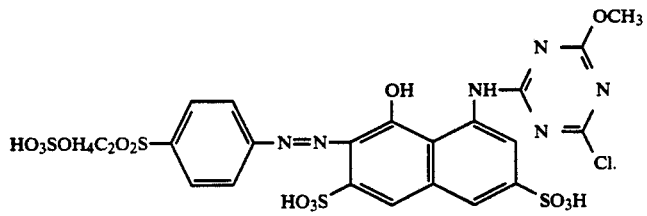

However, these known red dyes still need to be improved with respect to their dye performance properties including solubility, build-up, color yield and fastness of the dyed or printed products such as acid hydrolysis fastness, chlorine fastness and the like.

Solubility naturally is a significant property of the reactive dye which is necessary for performing the dyeing or printing of fiber materials without difficulty. This is for instance already known from a dictionary of dyes and dyeing, edited by K. G. Ponting, page 159 (1980). Moreover, dyeing and printing systems in a dye house have been actively mechanized and automated in many aspects to save both labor and energy. Therefore, the dyes for use in the modern dye house need to be formed into aqueous liquid compositions for use in the automatic weighing and dispensing systems of the modern dye house. This is another reason why the solubility of the reactive dye is important.

Generally speaking, a highly soluble, reactive dye has less affinity to fibers and its fiber reactive group is easy to hydrolyze. As a result, its build-up or color yield decreases. Thus, the solubility of the reactive dyes can be improved at the expense of build-up or color yield and vice versa.

However, there is a need for reactive dyes; whose solubility and build-up or color yield are both improved to a high degree.

The build-up or color yield of a reactive dye is its most significant property from an economical viewpoint. A reactive dye having a high build-up or color yield permits the use of lesser amounts of dye to achieve a deeper color depth than to a given amount of dye having poor build-up or color yield. Moreover, a reactive dye having a high build-up can achieve a deeper color than dyes having a poor build-up even though such poor build-up dyes are used in greater amounts.

Fastness of the dyed or printed products is significant for meeting the needs of users of the dyed or printed products, and in order to meet such needs that are in high demand, a dye molecule itself and dye-fiber linkage need to be stable under the conditions applied for a dyeing or printing procedure or an after-finishing as well as stable under conditions in various uses of the dyed or printed products.

The present inventors have made extensive studies to find a monoazo compound which meets the needs described above and is superior in other dye properties, and as a result, attained to the present invention.

The present invention provides a monoazo compound represented by the following formula (I) in the free acid form,

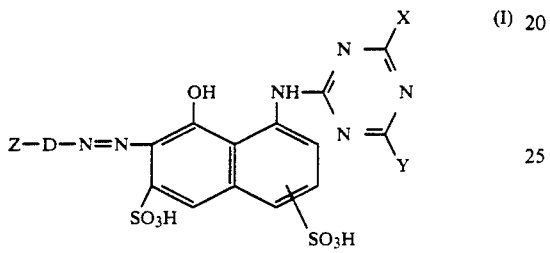
(I)

wherein D is unsubstituted or substituted phenylene or naphthylene, X is unsubstituted or substituted pyridinio, Z is —SO₂CH=CH₂ or —SO₂CH₂CH₂L in which L is a group capable of being split by the action of an alkali, and Y is —V—R in which V is —O— or —S—, and R is hydrogen or alkyl which may be substituted, cyclohexyl, phenyl which may be substituted, naphthyl which may be substituted or benzyl which may be substituted, or

in which R₁ and R₂ independently of one another are each hydrogen or unsubstituted or substituted alkyl, phenyl, naphthyl or benzyl.

The present invention also provides a process for producing the monoazo compound of the above formula (I), which comprises reacting an unsubstituted or substituted pyridine, cyanuric chloride or fluoride, an aromatic amine represented by the formula (III),

Z—D—NH₂     (III)

wherein Z and D are as defined above, H acid or K acid, and a compound represented by the formula (IV) or (V),

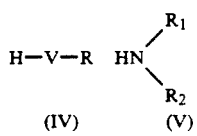

(IV)     (V)

wherein V, R, R₁ and R₂ are as defined above, to obtain the desired monoazo compound of the formula (I).

The present invention further provides a process for dyeing or printing fiber materials, which comprises using the monoazo compound of the formula (I).

In the above formula (I), the phenylene represented by D preferably includes those substituted once, twice or three times by methyl, ethyl, methoxy, ethoxy, halogeno, acetylamino, propionylamino, nitro, sulfo, carboxy, vinylsulfonyl or β-sulfatoethylsulfonyl. Of these, those substituted once or twice, particularly those such as sulfophenylene, are more preferable for better dye performance.

The naphthylene represented by D includes those substituted once or twice by sulfo, vinylsulfonyl or β-sulfatoethylsulfonyl. Of these, those substituted once, particularly those such as sulfonaphthylene, are more preferable for better dye performance.

Among those represented by D, the following are most preferable,

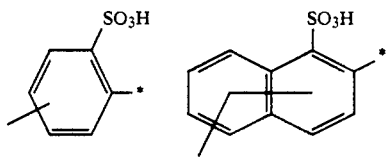

wherein the linkage marked with * bonds to the azo group.

The group capable of being split by the action of an alkali represented by L when Z is —SO₂CH₂CH₂L includes, for example, —OSO₃H, —ORO₃H₂, —O-COCH₃, —SSO₃H, —Cl and the like. Preferred are —SO₂CH₂CH₂OSO₃H and —SO₂CH=CH₂ as Z.

The alkyl represented by R when Y is —V—R preferably includes those having 1 to 4 carbon atoms, which are unsubstituted or substituted once or twice by alkoxy having 1 to 4 carbon atoms, sulfo, carboxy, hydroxy, chloro, phenyl, cyano or sulfato. Preferable examples thereof are methyl, ethyl, n-propyl, isopropyl, n-butyl, iso-butyl, sec-butyl, β-hydroxyethyl, β-sufatoethyl, β-sulfoethyl, β-methoxyethyl, β-ethoxyethyl, β-chloroethyl, and β-carboxyethyl.

The phenyl represented by R preferably includes those unsubstituted or substituted once or twice by alkyl having 1 to 4 carbon atoms, alkoxy having 1 to 4 carbon atoms, sulfo, carboxy, chloro or bromo. Preferable examples thereof are phenyl, 2-, 3- or 4-sulfophenyl, 2-, 3- or 4-chlorophenyl, 2-, 3- or 4-methylphenyl and 2-, 3- or 4-methoxyphenyl.

The naphthyl represented by R preferably includes those unsubstituted or substituted once, twice or three times by hydroxy, carboxy, sulfo, alkyl having 1 to 4 carbon atoms, alkoxy having 1 to 4 carbon atoms or chloro. Preferable examples thereof are 2-, 3-, 4-, 5-, 6-, 7- or 8-sulfo-1-naphthyl, 1-, 5-, 6-, 7- or 8-sulfo-2-naphthyl, 5,7-, 6,8-, 4,8-, 4,7-, 3,8-, 4,6-, 3,7-, or 3,6- disulfo-2-naphtyl, 4,6,8-, 2,4,7- or 3,6,8-trisulfo-1-naphthyl and 1,5,7-, 4,6,8- or 3,6,8-trisulfo-2-naphthyl.

The benzyl represented by R preferably includes those unsubstituted or substituted once or twice by alkyl having 1 to 4 carbon atoms, alkoxy having 1 to 4 carbon atoms, sulfo or chloro. Preferable examples thereof are benzyl and 2-, 3- or 4-sulfobenzyl.

The divalent group represented by V is preferably —O—.

The alkyl represented by R₁ and R₂ when Y is

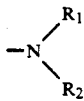

preferably includes those having 1 to 4 carbon atoms, which are unsubstituted or substituted once or twice by alkoxy having 1 to 4 carbon atoms, sulfo, carboxy, hydroxy, chloro, phenyl or sulfato. Preferable examples thereof are methyl, ethyl, n-propyl, iso-propyl, n-butyl, iso-butyl, sec-butyl, $\beta$-hydroxyethyl, $\beta$-sulfatoethyl, $\beta$-sulfoethyl, $\beta$-methoxyethyl, and $\beta$-carboxyethyl.

The phenyl represented by $R_1$ and $R_2$ preferably includes those unsubstituted or substituted once or twice by alkyl having 1 to 4 carbon atoms, alkoxy having 1 to 4 carbon atoms, sulfo, carboxy, chloro or bromo. Preferable examples thereof are phenyl, 2-, 3- or 4-sulfophenyl, 2-, 3- or 4-chlorophenyl, 2-, 3- or 4-bromophenyl, 2-, 3- or 4-methylphenyl and 2-, 3- or 4-methoxyphenyl.

The naphthyl represented by $R_1$ and $R_2$ preferably includes those unsubstituted or substituted once, twice or three times by hydroxy, carboxy, sulfo, alkyl having 1 to 4 carbon atoms, alkoxy having 1 to 4 carbon atoms or chloro. Preferable examples thereof are 2-, 3-, 4-, 5-, 6-, 7- or 8-sulfo-1-naphthyl, 1-, 5-, 6-, 7- or 8-sulfo-2-naphthyl, 5,7-, 6,8-, 4,8-, 4,7-, 3,8-, 4,6-, 3,7-, or 3,6-disulfo-2-naphtyl, 4,6,8-, 2,4,7- or 3,6,8-trisulfo-1-naphthyl and 1,5,7-, 4,6,8- or 3,6,8-trisulfo-2-naphthyl.

The benzyl represented by $R_1$ and $R_2$ preferably includes those unsubstituted or substituted once or twice by alkyl having 1 to 4 carbon atoms, alkoxy having 1 to 4 carbon atoms, sulfo or chloro. Preferable examples thereof are benzyl and 2-, 3- or 4- sulfo benzyl.

When Y is

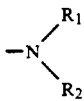

the case where any one of $R_1$ and $R_2$ is hydrogen, methyl or ethyl, and the other is phenyl unsubstituted or substituted by alkyl having 1 to 4 carbon atoms, alkoxy having 1 to 4 carbon atoms, carboxy or halogeno is particularly preferred for better dye performance.

The pyridinio represented by X preferably includes those unsubstituted or substituted by carboxy, carbamoyl, sulfo, halogeno or unsubstituted or substituted alkyl having 1 to 4 carbon atoms. Examples of the substituted alkyl are $\beta$-hydroxyethyl and $\beta$-sulfoethyl. Among those represented by X, more preferable are pyridinio, carboxypyridinio and carbamoylpyridinio, particularly carboxypyridinio.

The monoazo compound of the formula (I) may be in the form of a free acid or preferably in the form of an alkali metal or alkaline earth metal salt, such as sodium salt and potassium salt.

The monoazo compound of the formula (I) can be produced by any manner known per se using the unsubstituted or substituted pyridine, cyanuric chloride or fluoride, the aromatic amine of the formula (III), H acid (1-amino-8-naphthol-3,6-disulfonic acid) or K acid (1-amino-8-naphthol-4,6-disulfonic acid), and the compound of the formula (IV) or (V).

For example, the monoazo compound (I) can be produced by reacting the pyridine with a monoazo intermediate compound which was prepared in advance an having the following formula (VI) in the free acid form,

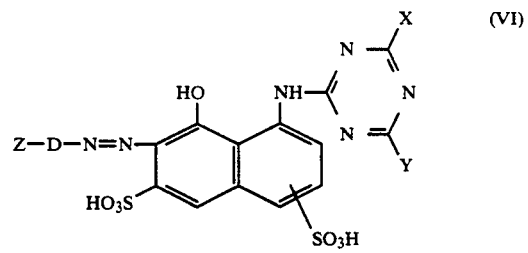

wherein Z, D and Y are as defined above, and W is chloro or fluoro, in an aqueous medium at the temperature of 50° to 100° C., preferably 70° to 100° C., while adjusting the pH within a range of 2 to 9, preferably 3 to 7.

The monoazo intermediate compound (VI) can be prepared by reacting a dihalogenotriazine represented by the following formula (VII),

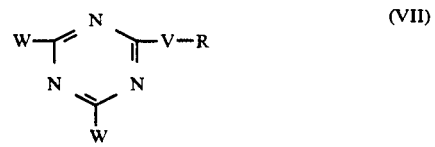

wherein V, W and R are as defined above, which was prepared in advance by reacting the compound of the formula (IV) with cyanuric chloride or fluoride in any conventional manner, with a monoazo intermediate represented by the following formula (VIII) in the free acid form,

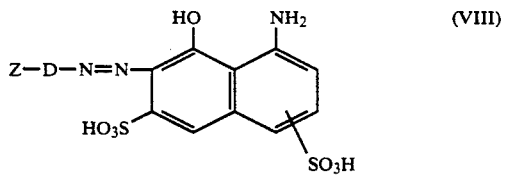

wherein Z and D are as defined above, in an aqueous medium at a temperature of 0° to 60° C., preferably 0° to 30° C. while adjusting the pH within the range of 1 to 7, preferably 2 to 6.

Alternatively, the monoazo intermediate compound (VI) can be prepared by subjecting any one of the compound (V) and the monoazo intermediate (VIII) to a first condensation with cyanuric chloride or fluoride, followed by a second condensation with the remaining compound, the first condensation being carried out in an aqueous medium at a temperature of $-10°$ to 50° C., preferably 0° to 30° C., while adjusting the pH within the range of 1 to 10, preferably 2 to 7, and the second condensation at a temperature of 0° to 70° C., preferably 10° to 50° C., while adjusting the pH within the range of 2 to 9, preferably 3 to 6.

The monoazo compound (I) can be produced also by subjecting the pyridine to a first condensation with the dihalogenotriazine (VII), followed by a second condensation with the monoazo intermediate (VIII), the first condensation being carried out in an aqueous medium at a temperature of 0° to 60° C., preferably 0° to 30° C., while adjusting the pH within the range of 1 to 10, preferably 2 to 7, and the second condensation in an aqueous medium at a temperature of 0° to 100° C., preferably 30° to 80° C., while adjusting the pH within the range of 2 to 9, preferably 3 to 7, or by reacting the pyridine with cyanuric chloride or fluoride in an aqueous medium at a temperature of −10° to 50° C., preferably 0° to 30° C., while adjusting the pH within the range of 1 to 10, preferably 2 to 7, and then subjecting the a resulting dihalogenotriazine to first condensation with any one of the monoazo intermediate (VIII) and the compound (V), followed by a second condensation with the remaining compound, the first condensation being carried out at a temperature of 0° to 70° C., preferably 10° to 50° C., while adjusting the pH within the range of 2 to 9, preferably 3 to 6, and the second condensation at a temperature 50° to 100° C., preferably 70° to 80° C., while adjusting the pH within the range of 2 to 9, preferably 3 to 7.

Alternatively, the monoazo compound (I) can be produced by subjecting the dihalogenotriazine (VII) to a first condensation with any one of H acid or K acid and the pyridine, followed by a second condensation with the remaining compound, and then coupling the resulting compound with a diazonium salt of the aromatic amine (III), or by reacting H acid or K acid, the compound (V), the pyridine and cyanuric chloride or fluoride one after another, followed by coupling the resulting compound with a diazonium salt of the aromatic amine (III).

In the production of the monoazo compound (I), the reaction order is not particularly limited, but considering the reaction yield and quality of the desired monoazo compound (I), it is preferable to use preferentially any starting compound lower in reactivity with the cyanuric chloride or fluoride, or the dihalogenotriazine (VII).

Preferable examples of the unsubstituted or substituted pyridine are pyridine, 2-, 3- or 4-carboxypyridine, 2-, 3- or 4-carbamoylpyridine, 3-sulfopyridine, 4-β-sulfoethylpyridine, 3-β-hydroxyethylpyridine, 4-chloropyridine, 3-methylpyridine, 3,5-dicarboxypyridine and the like. Of these, particularly preferred are 3-carboxypyridine (nicotinic acid) and 4-carboxypyridine (isonicotinic acid) .

The compounds (IV) usable for the production of monoazo compound (I) include aromatic and aliphatic compounds.

Examples of the aromatic compound are phenol, 1-hydroxy-2-, 3- or 4-methylbenzene, 1-hydroxy-3,4- or 3,5-dimethylbenzene, 1-hydroxy-2-, 3- or 4-ethylbenzene, 1-hydroxy-2-, 3-, or 4-methoxybenzene, 1-hydroxy-2- 3- or 4-ethoxybenzene, 1-hydroxy-2-, 3- or 4-chlorobenzene, 3- or 4-hydroxyphenylmethanesulfonic acid, 3-hydroxybenzenesulfonic acid, 4-hydroxybenzenesulfonic acid, 5-hydroxybenzene-1,3-disulfonic acid, 6-hydroxybenzene 1,4-disulfonic acid, 4-hydroxybenzene-1,2-disulfonic acid, 4-hydroxy-5-methylbenzene-1,2-disulfonic acid, 3- or 4-hydroxybenzoic acid, 5-hydroxybenzene-1,3-dicarboxylic acid, 5-hydroxy-2-ethoxybenzenesulfonic acid, 2-hydroxynaphthalene-1-sulfonic acid, 4-hydroxynaphthalene-1-sulfonic acid, 5-hydroxynaphthalene-1-sulfonic acid, 6-hydroxynaphthalene-1-sulfonic acid, 7-hydroxynaphthalene-1-sulfonic acid, 8-hydroxynaphthalene-1-sulfonic acid, 1-hydroxynaphthalene-2-sulfonic acid, 4-hydroxynaphthalene-2-sulfonic acid, 5-hydroxynaphthalene-2-sulfonic acid, 6-hydroxynaphthalene-2-sulfonic acid, 7-hydroxynaphthalene-2-sulfonic acid, 8-hydroxynaphthalene-2-sulfonic acid, 4-hydroxynaphthalene-1,3-disulfonic acid, 5-hydroxynaphthalene-1,3-disulfonic acid, 6-hydroxynaphthalene-1,3-disulfonic acid, 7-hydroxynaphthalene-1,3-disulfonic acid, 8-hydroxynaphthalene-1,3-disulfonic acid, 2-hydroxynaphthalene-1,5-disulfonic acid, 3-hydroxynaphthalene-1,5-disulfonic acid, 4-hydroxynaphthalene-1,5-disulfonic acid, 4-hydroxynaphthalene-1,6-disulfonic acid, 8-hydroxynaphthalene-1,6-disulfonic acid, 4-hydroxynaphthalene-1,7-disulfonic acid, 3-hydroxynaphthalene-2,6-disulfonic acid, 4-hydroxynaphthalene-2,6-disulfonic acid, 3-hydroxynaphthalene-2,7-disulfonic acid, 4-hydroxynaphthalene-2,7-disulfonic acid, 6-hydroxynaphthalene-1,3,5-trisulfonic acid, 7-hydroxynaphthalene-1,3,5-trisulfonic acid and 4-hydroxynaphthalene-1,3,6-trisulfonic acid.

Examples of the aliphatic compounds are methanol, ethanol, n-propanol, isopropanol, n-butanol, isobutanol, sec-butanol, 2-chloroethanol, 2-methoxyethanol, 2-ethoxyethanol, 3-methoxypropanol, 3-ethoxypropanol, 2-hydroxyethanesulfonic acid, 3-hydroxy1-propanesulfonic acid, 2-cyanoethanol, 2-sulfatoethanol, glycolic acid, 3-hydroxypropionic acid, benzyl alcohol, 2-, 3- or 4-chlorobenzyl alcohol, 4-methylbenzyl alcohol, 2-, 3- or 4-sulfobenzyl alcohol, 2-phenylethanol, and 1-phenyl-2-propanol.

Further, anologues having mercapto in place of hydroxy in the above compounds are exemplified for the compounds (IV).

The compounds (V) usable for the production of monoazo compounds (I) include aromatic amines and aliphatic amines.

Examples of the aromatic amines are 1-aminobenzene, 1-amino-2-, 3- or 4-methylbenzene, 1-amino-3,4- or 3,5-dimethylbenzene, 1-amino-2-, 3- or 4-ethylbenzene, 1-amino-2-, 3- or 4-methoxybenzene, 1-amino-2-, 3- or 4-ethoxybenzene, 1-amino-2-, 3- or 4-chlorobenzene, 1-amino-2-, 3- or 4-bromobenzene, 3- or 4-aminophenylmethanesulfonic acid, 3-aminobenzenesulfonic acid, 4-aminobenzenesulfonic acid, 3-N-methylaminobenzenesulfonic acid, 3-N-ethylaminobenzenesulfonic acid, 4-N-methylaminobenzenesulfonic acid, 4-N-ethylaminobenzenesulfonic acid, 5-aminobenzene-1,3-disulfonic acid, 6-aminobenzene-1,4-disulfonic acid, 4-aminobenzene-1,2-disulfonic acid, 4-amino-5-methylbenzene-1,2-disulfonic acid, 3- or 4-aminobenzoic acid, 5-aminobenzene-1,3-dicarboxylic acid, 5-amino-2-hydroxybenzenesulfonic acid, 4-amino-2-hydroxybenzenesulfonic hydroxybenzenesulfonic acid, 5-amino-2-ethoxybenzenesulfonic acid, N-methylaminobenzene, N-ethylaminobenzene, 1-N-methylamino-3- or 4-methylbenzene, 1-N-ethylamino-4chlorobenzene, 1-N-ethylamino-3- or 4-methylbenzene, 1-N-(2-hydroxethyl)amino-3-methylbenzene, 3- or 4-N-methylaminobenzoic acid, 3- or 4-N-methylaminobenzene-sulfonic acid, 2-aminonaphthalene-1-sulfonic acid, 4-aminonaphthalene-1-sulfonic acid, 5-aminonaphthalene-1-sulfonic acid, 6-aminonaphthalene-1-sulfonic acid, 7-aminonaphthalene-1-sulfonic acid, 8-aminonaphthalene-1-sulfonic acid, 1 aminonaphthalene-2-sulfonic acid, 4-aminonaphthalene-2-sulfonic acid, 5-aminonaphthalene-2-sulfonic acid, 6-aminonaphthalene-2-sulfonic acid, 7-aminonaphthalene-2-sulfonic acid, 7-N-methylaminonaphthalene-2-sulfonic acid, 7-N-ethylaminonaphthalene-2-sulfonic acid, 7-N-butylaminonaphthalene-2-sulfonic acid, 7-N-isobutylaminonaphthalene-2-sulfonic acid, 8- aminonaphthalene-2-sulfonic acid, 4-aminonaphthalene-1,3-disulfonic acid, 5-aminonaphthalene-1,3-disulfonic acid, 6-aminonaphthalene-1,3-disulfonic acid, 7-aminonaphthalene-1,3-disulfonic acid, 8-aminonaphthalene-1,3-disulfonic acid, 2-aminonaphthalene-1,5-disulfonic acid, 3-aminonaphthalene-1,5-disulfonic acid, 4-aminonaphthalene-1,5-disulfonic acid, 4-aminonaphthalene-1,6-disulfonic acid, 8-aminonaphthalene-1,6-disulfonic acid, 4-aminonaphthalene-1,7-disulfonic acid, 3-aminonaphthalene-2,6-disulfonic acid, 4-aminonaphthalene-2,6-disulfonic acid, 3-aminonaphthalene-2,7-disulfonic acid, 4-aminonaphthalene-2,7-disulfonic acid, 6-aminonaphthalene-1,3,5-trisulfonic acid, 7-aminonaphthalene-1,3,5-trisulfonic acid, 4-aminonaphthalene-1,3,6-trisulfonic acid, 7-aminonaphthalene-1,3,6-trisulfonic acid, 8-aminonaphthalene-1,3,6-trisulfonic acid and 4-aminonaphthalene-1,3,7-trisulfonic acid.

Examples of the aliphatic amine are methylamine, ethylamine, n-propylamine, isopropylamine, n-butylamine, isobutylamine, sec-butylamine, dimethylamine, diethylamine, methylethylamine, allylamine, 2-chloroethylamine, 2-methoxyethylamine, 2-aminoethanol, 2-methylaminoethanol, bis-(2-hydroxyethyl) amine, 2-acetylaminoethanol, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfatoethylamine, aminoacetic acid, methylaminoacetic acid, z-aminocaproic acid, benzylamine, 2-, 3- or 4-chlorobenzylamine, 4-methylbenzylamine, N-methylbenzylamine, 2-, 3- or 4-sulfobenzylamine, 2-phenylethyl amine, 1-phenylethylamine and 1-phenyl-2-propylamine.

Of these, preferably used are 1-aminobenzene, 1-N-methylaminobenzene, 1-N-ethylaminobenzene, 2-, 3- or 4-chloroaniline, 2-, 3- or 4-bromoaniline, 1-N-methylamino-2-, 3- or 4-chlorobenzene, 1-N-ethylamino-2-, 3- or 4-chloroaniline and 1-amino-2-, 3- or 4methylbenzene.

The monoazo compound in accordance with the present invention is fiber-reactive and useful for dyeing or printing hydroxyl group-containing and amide group-containing materials. The materials are favorably in a fibrous form including unmixed or mixed fibers.

The hydroxyl group-containing materials include natural or synthetic hydroxyl group-containing materials such as cellulose fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in any suitable methods, which can be selected from conventional manners depending on the physical and chemical properties of acid fiber materials.

For example, cellulose fiber materials can be dyed using the present monoazo compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired using a neutral salt such as sodium sulfate, sodium chloride and the like, optionally together with dissolving assistants, penetrants or level dyeing agents. The neutral salt which can be used for promoting the exhaustion of the dye may be added to a dye bath at the time when the bath temperature reaches a level desired for the dyeing, or prior thereto. Alternatively, the neutral salt may be added thereto dividedly.

The padding can be carried out by padding the fiber materials at ambient temperature or an elevated temperature, and after drying, steaming or dry-heating the materials to perform the dye-fixation.

The printing can be carried out by a one-phase or two-phase procedure. The one-phase printing may be conducted by printing the fiber materials with a printing paste containing an acid binding agent such as sodium hydrogen carbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or dispersing agent.

The acid binding agent useful for fixing the compound of the present invention on the cellulose fiber materials includes water-soluble basic salts consisting of alkali or alkaline earth metals and inorganic or organic acids or compounds capable of liberating alkalis under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogencarbonate, sodium carbonate, sodium formate, potassium carbonate, sodium dihydrogenphosphate, disodium hydrogenphosphate, trisodium phosphate, sodium silicate, sodium trichloroacetate and the like.

The dyeing of the natural or synthetic polyamide and polyurethane fiber materials can be carried out by performing exhaustion in an acid or weak acid bath, while controlling the pH value, and then making the bath neutral, or in some cases alkaline, to perform the fixation. The dyeing temperature ranges usually from 60° to 120° C. In order to achieve a level dyeing, there may be used a conventional level dyeing agent such as a condensation product of 1 part between cyanuric chloride and 3 parts aminobenzenesulfonic acid or aminonaphthalenesulfonic acid, or an addition product between stearylamine and ethylene oxide, and the like.

The present monoazo compound (I) can be characterized by excellent dye performance properties in the dyeing and printing of fiber materials, particularly cellulose fiber materials. For example, the compound can produce a dyed product excellent in light fastness, perspiration-light fastness, formalin fastness, wet fastness such as washing resistance, peroxide-washing resistance, chlorine fastness, chlorine bleaching fastness, perspiration resistance and acid-hydrolysis resistance, and alkali fastness, abrasion fastness and iron fastness.

The monoazo compound (I) can also exhibit excellent build-up, level-dyeing and wash-off properties and high solubility as well as high exhaustion and fixation percentages. Moreover, the monoazo compound (I) can hardly be affected by changes in the dyeing temperature, kind of alkali agent, amount of inorganic salt and dyeing bath ratio, so that a dyed product with a constant quality can be obtained with superior reproducibility.

In the cold batch-up dyeing method, the monoazo compound (I) can exhibit an excellent build-up property and alkali stability, and moreover exhibit characteristic features such that it is difficult to find any difference in the color depth and shade between those dyed at 25° C. and those dyed at temperatures lower than that, and they are robust against hydrolysis by the action of an alkali agent.

The present invention is illustrated in more detail with reference to the following Examples, which are only illustrative, and in which parts and % are by weight.

EXAMPLE 1

Cyanuric chloride (184.5 parts) and methanol (32 parts) were subjected to condensation in a conventional manner, followed by reaction with 1-amino-8-naphthol-3,6-disulfonic acid (319 parts) under a weak alkaline condition in an aqueous medium, thereby obtaining a compound having the following formula in the free acid form.

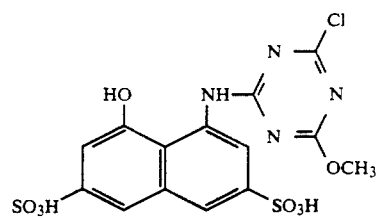

Then, 2-aminonaphthalene-6-$\beta$-sulfatoethylsulfone-1-sulfonic acid (411 parts) was diazotized in a conventional manner. The resulting diazonium salt and the compound obtained above were subjected to a coupling reaction, followed by condensation with nicotinic acid (123 parts). Salting out of the reaction mixture with sodium chloride and isolation gave a monoazo compound represented by the following formula in the free acid form.

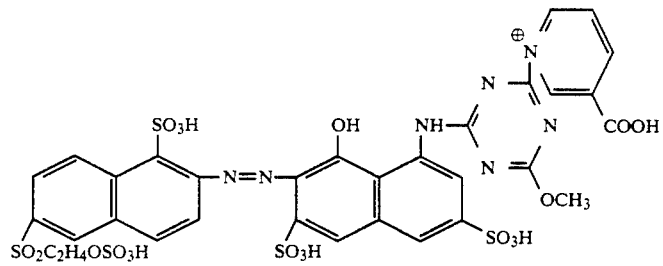

EXAMPLE 2

Example 1 was repeated, except that the 2-aminonaphthalene-6-$\beta$-sulfatoethylsulfone-1-sulfonic acid (diazo component), 1-amino-8-naphthol-3,6-disulfonic acid (coupler), methanol (compound IV) and nicotinic acid (pyridine compound) were replaced with those shown in the columns 2 to 5 of the following table, respectively, thereby obtaining the corresponding monoazo compound to give a dyed product of a color shown in the column 6.

TABLE

| 1 Run No. | 2 Diazo component | 3 Coupler | 4 Compound IV | 5 Pyridine compound | 6 Color |
|---|---|---|---|---|---|
| 1 | NH$_2$, SO$_3$H, SO$_2$C$_2$H$_4$OSO$_3$H (aniline derivative) | OH, NH$_2$, SO$_3$H, SO$_3$H (naphthol derivative) | HOCH(CH$_3$)$_2$ | COOH-pyridine | Red |
| 2 | " | " | HO–cyclohexyl | N-COOH pyridine | " |
| 3 | " | " | HO–phenyl | CONH$_2$-pyridine | " |

TABLE -continued
| Run No. | Diazo component | Coupler | Compound IV | Pyridine compound | Color |
|---|---|---|---|---|---|
| 4 | " | " | 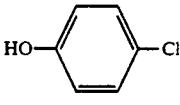 | 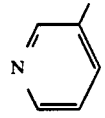 | " |
| 5 | " | " | 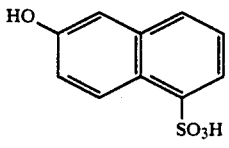 | 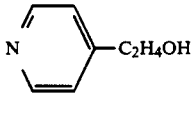 | " |
| 6 | 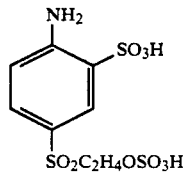 | 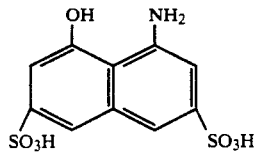 | HO—C$_2$H$_4$OC$_2$H$_5$ | 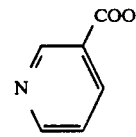 | Red |
| 7 | " | " | 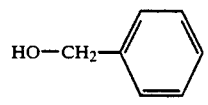 | 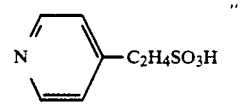 | " |
| 8 | " | " | 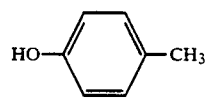 | 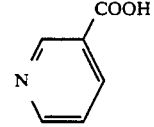 | " |
| 9 | 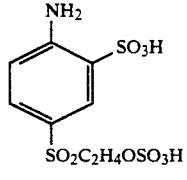 | " | HOC$_2$H$_5$ | 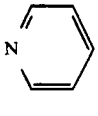 | " |
| 10 | " | " | HO—C$_2$H$_4$Cl | 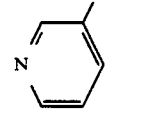 | " |
| 11 | 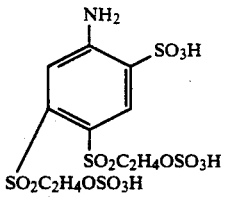 | " | HO—(CH$_2$)$_3$CH$_3$ | 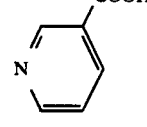 | " |
| 12 | 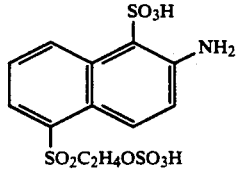 | 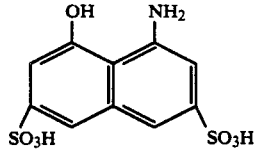 | HO—CH(CH$_3$)$_2$ | 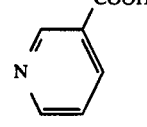 | Bluish red |
| 13 | " | " | HOC$_2$H$_5$ | 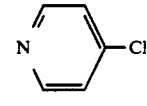 | Bluish red |

TABLE -continued

| Run No. | Diazo component | Coupler | Compound IV | Pyridine compound | Color |
|---|---|---|---|---|---|
| 14 | " | " | 3-HO-C6H4-SO3H | 3-methylpyridine | Bluish red |
| 15 | " | " | cyclohexanol | nicotinic acid (3-COOH pyridine) | Bluish red |
| 16 | " | " | HOC2H4OC2H5 | " | Bluish red |
| 17 | " | " | HOC3H6OCH3 | " | Bluish red |
| 18 | " | " | HOC2H3(CH3)2 | " | Bluish red |
| 19 | 2-amino-1-sulfo-5-(β-sulfatoethylsulfonyl)naphthalene | 1-hydroxy-8-amino-3,6-disulfonaphthalene (H-acid isomer: OH, NH2, SO3H, SO3H) | cyclohexanol | nicotinic acid | Red |
| 20 | " | " | phenol (HO-C6H5) | " | " |
| 21 | 2-amino-1-sulfo-6-(β-sulfatoethylsulfonyl)naphthalene | 1-hydroxy-8-amino-3,6-disulfonaphthalene | HO—C2H5 | " | " |
| 22 | " | " | HO—CH(CH3)2 | " | " |
| 23 | " | " | HOC2H4Cl | " | " |
| 24 | " | " | HOC2H4CN | " | " |
| 25 | " | " | HOC2H4COOH | " | " |
| 26 | 2-amino-1-sulfo-6-(β-sulfatoethylsulfonyl)naphthalene | 1-hydroxy-8-amino-3,6-disulfonaphthalene | HOC2H4SO3H | nicotinic acid | Bluish red |
| 27 | " | " | HO—C2H4OCH3 | " | Bluish red |
| 28 | " | " | cyclohexanol | " | Bluish red |
| 29 | " | " | 2,4-dimethylphenol | " | Bluish red |

TABLE -continued

| 1 Run No. | 2 Diazo component | 3 Coupler | 4 Compound IV | 5 Pyridine compound | 6 Color |
|---|---|---|---|---|---|
| 30 | " | 4-amino-5-hydroxy-naphthalene-1,7-disulfonic acid (OH, NH₂, SO₃H, SO₃H on naphthalene) | HO—⟨C₆H₄⟩—OCH₃ | " | Red |
| 31 | 2-amino-naphthalene with SO₃H, SO₃H, SO₂C₂H₄OSO₃H substituents | 4-amino-5-hydroxy-naphthalene-2,7-disulfonic acid | HO—CH(CH₃)₂ | nicotinic acid (pyridine-3-COOH) | Bluish red |
| 32 | 2-amino-naphthalene with SO₃H, SO₃H, SO₂C₂H₄OSO₃H substituents | 4-amino-5-hydroxy-naphthalene-2,7-disulfonic acid | HS—C₂H₅ | nicotinic acid (pyridine-3-COOH) | Bluish red |
| 33 | 2-amino-naphthalene with SO₃H, SO₂C₂H₄OSO₃H substituents | 4-amino-5-hydroxy-naphthalene-2,7-disulfonic acid | HS—C₂H₄—⟨C₆H₅⟩ | " | Bluish red |
| 34 | " | " | HS—⟨C₆H₅⟩ | " | Bluish red |
| 35 | aniline with NH₂, SO₃H, SO₂C₂H₄OSO₃H | " | HS—⟨C₆H₄⟩—Br | " | Red |
| 36 | 2-amino-naphthalene with SO₃H, SO₂C₂H₄OSO₃H substituents | 4-amino-5-hydroxy-naphthalene-2,7-disulfonic acid | 2-methoxyphenol (OCH₃, HO on benzene) | pyridine-3-COOH (nicotinic acid) | Bluish red |
| 37 | " | " | 2-methylphenol (HO—⟨C₆H₄⟩—CH₃) | " | Bluish red |
| 38 | " | " | 2-chlorophenol (HO—⟨C₆H₄⟩—Cl) | " | Bluish red |

| Run No. | Diazo component | Coupler | Compound IV | Pyridine compound | Color |
|---|---|---|---|---|---|
| 39 | ![naphthalene with SO3H, NH2, SO2C2H4OSO3H] | " | " | " | Bluish red |
| 40 | ![naphthalene with SO3H, NH2, SO2C2H4OSO3H] | ![naphthol with OH, NH2, SO3H, SO3H] | " | " | Red |
| 41 | ![naphthalene with SO3H, NH2, SO2C2H4OSO3H] | ![naphthol with OH, NH2, SO3H, SO3H] | HO—C6H4—OCH3 | pyridine-COOH | Bluish Red |
| 42 | " | " | HO—C6H4—CH3 | " | Bluish Red |

EXAMPLE 3

Cyanuric chloride (184.5 parts), 1-amino-8-naphthol-3,6-disulfonic acid (319.3 parts) and aniline (93 parts) were subjected to condensations one after another by a conventional manner, thereby obtaining a compound having the following formula.

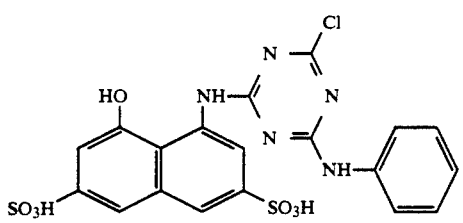

2-aminonaphthalene-6-β-sulfateothylsulfone-1-sulfonic acid (411 parts) was diazotized in a conventional manner. The resulting diazonium salt and the compound obtained above were subjected to a coupling reaction, followed by condensation with nicotinic acid (123 parts). Salting out of the reaction mixture with sodium chloride, and isolation gave a monoazo compound represented by the following formula in the free acid form.

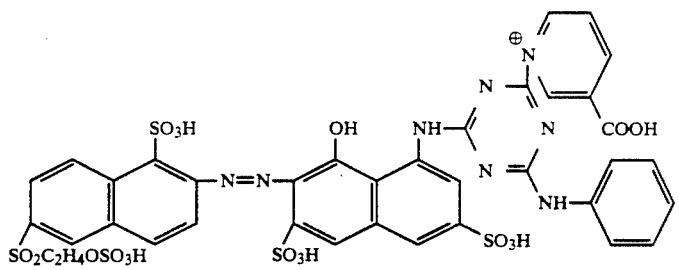

EXAMPLE 4

Example 3 was repeated, except that the 2-aminonaphthalene-6-β-sulfatoethylsulfone-1-sulfonic acid (diazo component), 1-amino-8-naphthol-3,6-disulfonic acid (coupler), aniline (compound V) and nicotinic acid (pyridine compound) were replaced with those shown in the columns 2 to 5 of the following table, respectively, thereby obtaining the corresponding monoazo compound to give a dyed product of a color shown in the column 6.

TABLE

| Run No. | Diazo component | Coupler | Compound V | Pyridine compound | Color |
|---|---|---|---|---|---|
| 1 | 2,4-diamino benzene with NH₂, SO₃H, SO₂C₂H₄OSO₃H substituents | 8-amino-1-hydroxynaphthalene-3,6-disulfonic acid (OH, NH₂, SO₃H, SO₃H) | aniline (H₂N-C₆H₅) | nicotinic acid (pyridine-3-COOH) | Red |
| 2 | " | " | 4-chloroaniline (H₂N-C₆H₄-Cl) | " | " |
| 3 | " | " | 4-ethylaniline (H₂N-C₆H₄-C₂H₅) | isonicotinic acid (pyridine-4-COOH) | " |
| 4 | " | " | N-ethyl-4-chloroaniline (C₂H₅-HN-C₆H₄-Cl) | nicotinamide (pyridine-3-CONH₂) | " |
| 5 | " | " | N-ethylaniline (C₂H₅-HN-C₆H₅) | pyridine-3-sulfonic acid (SO₃H) | " |
| 6 | NH₂, SO₃H, SO₂C₂H₄OSO₃H benzene | OH, NH₂, SO₃H, SO₃H naphthalene | $H_2NC_2H_4SO_3H$ | nicotinic acid (COOH) | Red |
| 7 | " | " | $H_2NC_2H_4OH$ | 4-(2-sulfoethyl)pyridine (N-C₂H₄SO₃H) | " |
| 8 | " | " | 6-amino-2-naphthalenesulfonic acid (H₂N-naphthalene-SO₃H) | nicotinic acid (COOH) | " |
| 9 | " | " | benzylamine (H₂NCH₂-C₆H₅) | pyridine | " |
| 10 | NH₂, SO₃H, SO₂CH=CH₂ benzene | " | N-ethyl-3-sulfoanilide (C₂H₅-HN-C₆H₄-SO₃H) | nicotinic acid (COOH) | " |

TABLE-continued

| 1 Run No. | 2 Diazo component | 3 Coupler | 4 Compound V | 5 Pyridine compound | 6 Color |
|---|---|---|---|---|---|
| 11 | 2-amino-benzene with SO₃H and SO₂C₂H₄OSO₃H | 1-OH, 8-NH₂ naphthalene with 3,6-di-SO₃H | aniline (H₂N-C₆H₅) | 4-chloropyridine | yellowish red |
| 12 | 2-amino-benzene with SO₃H and SO₂C₂H₄Cl | same as above | N-methylaniline (CH₃-NH-C₆H₅) | 3-methylpyridine | yellowish red |
| 13 | 2-amino-benzene with SO₃H and SO₂C₂H₄OSO₃H (different substitution) | 1-OH, 8-NH₂ naphthalene with 3,6-di-SO₃H | aniline | nicotinic acid (pyridine-3-COOH) | " |
| 14 | " | " | o-toluidine (2-CH₃ aniline) | isonicotinamide (pyridine-4-CONH₂) | " |
| 15 | 1-SO₃H, 2-NH₂, 5-SO₂C₂H₄OSO₃H naphthalene | " | 4-chloroaniline | nicotinic acid | Bluish red |
| 16 | " | " | aniline | " | " |
| 17 | " | " | 4-methylaniline (p-toluidine) | isonicotinic acid (pyridine-4-COOH) | " |
| 18 | 1-SO₃H, 2-NH₂, 5-SO₂C₂H₄OSO₃H naphthalene | 1-OH, 8-NH₂ naphthalene with 3,6-di-SO₃H | CH₃-NH-N-C₂H₄SO₃H | isonicotinic acid | Bluish red |
| 19 | 1-SO₃H, 2-NH₂, 6-SO₂C₂H₄OSO₃H naphthalene | " | 4-chloroaniline | nicotinic acid | " |
| 20 | " | " | N-methylaniline | isonicotinamide | " |

TABLE-continued

| 1 Run No. | 2 Diazo component | 3 Coupler | 4 Compound V | 5 Pyridine compound | 6 Color |
|---|---|---|---|---|---|
| 21 | " | " | $C_2H_5$-HN–⟨C_6H_4⟩–Cl | nicotinic acid (pyridine-3-COOH) | " |
| 22 | " | " | $H_2N-C_2H_5$ | pyridine-4-$C_2H_4SO_3H$ | " |
| 23 | " | " | $HN(C_2H_4OH)_2$ | 4-chloropyridine | " |
| 24 | 1-SO$_3$H, 2-NH$_2$, 6-SO$_2$C$_2$H$_4$OSO$_3$H naphthalene | 1-OH, 8-NH$_2$, 3,6-diSO$_3$H naphthalene (H-acid) | $H_2N-CH(CH_3)_2$ | 3-ethylpyridine | Red |
| 25 | 1-NH$_2$, 2-SO$_3$H, 4,5-di(SO$_2$C$_2$H$_4$OSO$_3$H) benzene | 1-OH, 8-NH$_2$, 3,6-diSO$_3$H naphthalene | $HN(C_2H_5)_2$ | nicotinic acid | " |
| 26 | 1-SO$_3$H, 2-NH$_2$, 5-SO$_2$C$_2$H$_4$OSO$_3$H naphthalene | " | 2-CH$_3$, 4-OCH$_3$ aniline | " | Bluish red |
| 27 | " | " | $H_2N-C_2H_4OCH_3$ | " | " |
| 28 | 1-SO$_3$H, 2-NH$_2$, 6-SO$_2$C$_2$H$_4$OSO$_3$H naphthalene | " | 4-methylaniline | " | " |
| 29 | 1-SO$_3$H, 2-NH$_2$, 6-SO$_2$C$_2$H$_4$OSO$_3$H naphthalene | 1-OH, 8-NH$_2$, 3,6-diSO$_3$H naphthalene | 2,4-dimethylaniline | nicotinic acid | Bluish Red |
| 30 | " | " | 4-ethylaniline | " | " |

TABLE-continued

| Run No. | Diazo component | Coupler | Compound V | Pyridine compound | Color |
|---|---|---|---|---|---|
| 31 | " | 4-amino-5-hydroxynaphthalene-2,7-disulfonic acid (OH, NH₂, SO₃H, SO₃H) | aniline ($H_2N$-C₆H₅) | " | " |
| 32 | " | " | 4-chloroaniline ($H_2N$-C₆H₄-Cl) | " | " |
| 33 | " | " | N-ethyl-4-bromoaniline (HN(C₂H₅)-C₆H₄-Br) | " | " |
| 34 | " | " | $HN(C_2H_5)_2$ | " | " |
| 35 | 2-amino-1-sulfo-6-vinylsulfonylnaphthalene (SO₃H, NH₂, SO₂CH=CH₂) | 4-amino-5-hydroxynaphthalene-2,7-disulfonic acid | $H_2N-C_2H_4SO_3H$ | nicotinic acid (COOH, N) | Red |
| 36 | 2-amino-1-sulfo-6-(β-sulfatoethylsulfonyl)naphthalene (SO₃H, NH₂, SO₂C₂H₄OSO₃H) | " | p-toluidine ($H_2N$-C₆H₄-CH₃) | " | " |
| 37 | " | " | p-phenetidine ($H_2N$-C₆H₄-OC₂H₅) | " | " |
| 38 | 2-amino-1,7-disulfo-5-(β-sulfatoethylsulfonyl)naphthalene (SO₃H, SO₃H, NH₂, SO₂C₂H₄OSO₃H) | " | 4-ethylaniline ($H_2N$-C₆H₄-C₂H₅) | " | " |
| 39 | " | 4-amino-5-hydroxynaphthalene-2,7-disulfonic acid (OH, NH₂, SO₃H, SO₃H) | aniline ($H_2N$-C₆H₅) | " | Bluish red |
| 40 | 2-amino-1,7-disulfo-5-(β-sulfatoethylsulfonyl)naphthalene (SO₃H, SO₃H, NH₂, SO₂C₂H₄OSO₃H) | 4-amino-5-hydroxynaphthalene-2,7-disulfonic acid (OH, NH₂, SO₃H, SO₃H) | 4-chloroaniline ($H_2N$-C₆H₄-Cl) | nicotinic acid (COOH, N) | Bluish red |

TABLE-continued

| 1 Run No. | 2 Diazo component | 3 Coupler | 4 Compound V | 5 Pyridine compound | 6 Color |
|---|---|---|---|---|---|
| 41 | 2-amino-6-(2-sulfatoethylsulfonyl)naphthalene-1-sulfonic acid | " | $H_2N-C_2H_4COOH$ | " | " |
| 42 | " | " | 3-aminobenzenesulfonic acid ($H_2N$-C$_6$H$_4$-$SO_3H$) | " | " |
| 43 | " | " | $H_2N-C_2H_4CONH_2$ | " | " |
| 44 | 2-amino-5-(2-sulfatoethylsulfonyl)naphthalene-1-sulfonic acid | " | N-ethyl-4-chloroaniline | " | " |
| 45 | " | " | 6-aminonaphthalene-1-sulfonic acid | " | " |
| 46 | 2-amino-5-(2-sulfatoethylsulfonyl)naphthalene-1-sulfonic acid | 8-hydroxy-1-amino-naphthalene-3,6-disulfonic acid | 2-bromoaniline | pyridine-3-sulfonic acid | Bluish red |
| 47 | " | " | 4-ethylaniline | " | " |
| 48 | " | " | 2-methoxyaniline | " | " |
| 49 | 2-amino-6-(2-sulfatoethylsulfonyl)naphthalene-1-sulfonic acid | 8-hydroxy-1-amino-naphthalene-3,6-disulfonic acid | N-methylaniline | " | Red |
| 50 | " | " | 2-methylaniline | " | " |

TABLE-continued

| Run No. | Diazo component | Coupler | Compound V | Pyridine compound | Color |
|---|---|---|---|---|---|
| 51 | 1-amino-2-naphthol with SO₃H, SO₃H, SO₂C₂H₄OSO₃H substituents ($SO_3H$, $SO_3H$, $NH_2$, $SO_2C_2H_4OSO_3H$) | naphthalene with OH, NH₂, SO₃H, SO₃H | 2-chloroaniline ($H_2N$–C₆H₄–Cl) | pyridine-3-carboxylic acid (N-pyridyl-COOH) | Red |
| 52 | " | " | 2-methoxyaniline ($H_2N$–C₆H₄–$OCH_3$) | " | " |
| 53 | " | naphthalene with OH, NH₂, SO₃H, SO₃H | 2-bromoaniline ($H_2N$–C₆H₄–Br) | " | Bluish red |
| 54 | naphthalene with SO₃H, NH₂, SO₂C₂H₄OSO₃H | " | 4-methylaniline ($H_2N$–C₆H₄–$CH_3$) | " | " |
| 55 | " | naphthalene with OH, NH₂, SO₃H, SO₃H | $H_2NC_2H_5$ | " | " |
| 56 | naphthalene with SO₃H, NH₂, SO₂C₂H₄OSO₃H | " | $H_2NCH_2CH_2CH_3$ | " | " |

DYEING EXAMPLE 1

Each monoazo compound obtained in Examples 1 and 3 (0.3 part) was dissolved in water (200 parts), and sodium sulfate (20 parts) and cotton (10 parts) were added thereto. The bath was heated to 50° C., and 30 minutes thereafter, sodium carbonate (4 parts) was added to the bath. Dyeing was continued for 1 hour at that temperature. Thereafter, the cotton taken out was washed with water and soaped to obtain each dyed product of bluish red color excellent in fastness properties, particularly those such as chlorine fastness, light fastness and perspiration-light fastness, with superior build-up property.

DYEING EXAMPLE 2

Each monoazo compound obtained in Examples 1 to 4 (0.3 part) was dissolved in water (300 parts), and sodium sulfate (30 parts) and cotton (10 parts) were added thereto. The bath was heated to 6° C., and 20 minutes thereafter, sodium carbonate (5 parts) was added to the bath. Dyeing was continued for 1 hour at that temperature. Thereafter, the cotton taken out was washed with water and soaped to obtain each dyed product of red color excellent in fastness properties, particularly those such as chlorine fastness, light fastness and perspiration-light fastness, with superior build-up property.

DYEING EXAMPLE 3

| Composition of color paste | |
|---|---|
| Each monoazo compound obtained in Examples 1 to 4 | 5 parts |
| Urea | 5 parts |
| Sodium alginate (5%) stock paste | 50 parts |
| Hot water | 25 parts |
| Sodium bicarbonate | 2 parts |
| Balance (water) | 13 parts |

Mercerized cotton broad cloth was printed with the color paste having the above composition, pre-dried, steamed at 100° C. for 5 minutes, washed with hot water, soaped, again washed with hot water and dried.

Thus, printed products of a red color excellent in fastness properties, particularly those such as chlorine fastness, light fastness and perspiration-light fastness and having superior build-up properties were obtained.

DYEING EXAMPLE 4

Each monoazo compound obtained in Examples 1 to 4 (25 parts) was dissolved in hot water, and the solution was cooled to 25° C. 32.5% aqueous sodium hydroxide solution (5.5 parts) and 50°Be' water glass (150 parts) were added thereto, and water was added to make the whole of 1000 parts at 25° C. to obtain a padding liquor. Immediately thereafter, cotton cloth was padded with the padding liquor and batched up, and the cloth wrapped tightly with a polyethylene film was allowed to stand in a room kept at 20° C.

The above method manner was repeated to obtain a padded cotton cloth, which was then wrapped tightly with a polyethylene film, and allowed to stand in a room kept at 5° C.

Both cloths were allowed to stand for 20 hours, and thereafter washed with cold water and then hot water, soaped with a boiling detergent, washed with cold water and then dried.

There was observed almost no difference in the color shade and depth between the dyed products obtained after standing at 5° C. and 20° C. for 20 hours. In this cold batch-up dyeing method, each monoazo compound was found to have superior build-up properties.

DYEING EXAMPLE 5

Each monoazo compound obtained in Examples 1 to 4 (25 parts) was dissolved in hot water, and the solution was cooled to 25° C. 32.5% aqueous sodium hydroxide solution (10 parts) and anhydrous sodium sulfate (30 parts) were added thereto, and then water was added to make the whole of 1000 parts at 25° C. to prepare a padding liquor. Immediately thereafter, viscouse rayon woven fabric was padded with the padding liquor and batched up, and the fabric wrapped tightly with a polyethylene film, and allowed to stand in a room kept at 20° C.

The above method was repeated to obtain a padded fabric, which was then wrapped tightly with a polyethylene film, and allowed to stand in a room kept at 5° C.

Both fabrics were allowed to stand for 20 hours, and thereafter washed with cold water and then hot water, soaped with a boiling detergent, washed with cold water and then dried.

There was observed almost no difference in their color shade and depth between dyed products obtained after standing at 5° C. and 20° C. for 20 hours.

DYEING EXAMPLE 6

Dyeing example 2 was repeated, except that sodium carbonate was used in an amount of 3 parts instead of 5 parts, thereby producing dyed products having qualities similar to those obtained in Dyeing Example 2.

DYEING EXAMPLE 7

Dyeing example 2 was repeated, except that the dyeing was continued at 50° C. instead of 60° C., thereby producing each dyed products having qualities similar to those obtained in DYEING EXAMPLE 2. A dyeing temperature of 70° C. also gave similar results

DYEING EXAMPLE 8

Dyeing example 2 was repeated, except that sodium sulfate was used in an amount of 15 parts in place of 30 parts, thereby producing dyed products having qualities similar to those obtained in Dyeing Example 2.

We claim:

1. A monoazo compound represented by the following formula in the free acid form,

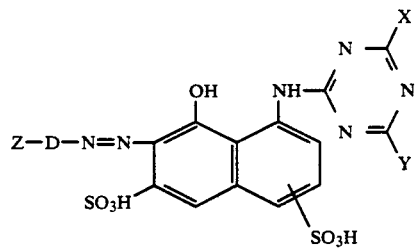

wherein D is phenylene which is unsubstituted or substituted once or twice by sulfo, vinylsulfonyl or β-sulfatoethylsulfonyl, or naphthylene which is unsubstituted or substituted once or twice by sulfo, vinylsulfonyl or β-sulfateothylsulfonyl;

X is pyridinio which is unsubstituted or substituted by carboxy or carbamoyl;

Z is $-SO_2CH=CH_2$ or $-SO_2CH_2CH_2L$ in which L is a group capable of being split by the action of an alkali; and Y is $-V-R$ in which V is $-O-$, and R is hydrogen, alkyl having 1 to 4 carbon atoms, which is unsubstituted or substituted once or twice by alkoxy having 1 to 4 carbon atoms, sulfo, carboxy, hydroxy, chloro, phenyl, cyano or sulfato, cyclohexyl, phenyl which is unsubstituted or substituted once or twice by alkyl having 1 to 4 carbon atoms, alkoxy having 1 to 4 carbon atoms, sulfo, carboxy or halogeno, naphthyl which is unsubstituted or substituted once, twice or thrice by hydroxy, carboxy, sulfo, alkyl having 1 to 4 carbon atoms, alkoxy having 1 to 4 carbon atoms or chloro, or benzyl which is unsubstituted or substituted once or twice by alkyl having 1 to 4 carbon atoms, alkoxy having 1 to 4 carbon atoms, sulfo or chloro, or

in which $R_1$ and $R_2$ independently of one another are each hydrogen, alkyl having 1 to 4 carbon atoms which is unsubstituted or substituted once or twice by alkoxy having 1 to 4 carbon atoms, sulfo, carboxy, hydroxy, chloro, phenyl or sulfato, phenyl which is unsubstituted or substituted once or twice by alkyl having 1 to 4 carbon atoms, alkoxy having 1 to 4 carbon atoms, sulfo, carboxy or halogeno, naphthyl which is unsubstituted or substituted once, twice or thrice by hydroxy, carboxy, sulfo, alkyl having 1 to 4 carbon atoms, alkoxy having 1 to 4 carbon atoms or chloro or benzyl which is unsubstituted or substituted once or twice by alkyl having 1 to 4 carbon atoms, alkoxy having 1 to 4 carbon atoms, sulfo or chloro.

2. The compound according to claim 1, wherein R is alkyl having 1 to 4 carbon atoms, which is unsubstituted or substituted once or twice by alkoxy having 1 to 4 carbon atoms, sulfo, carboxy, hydroxy, chloro, phenyl, cyano or sulfato.

3. The compound according to claim 1, wherein R is phenyl substituted once or twice by alkyl having 1 to 4 carbon atoms, alkoxy having 1 to 4 carbon atoms, sulfo, carboxy or halogeno.

4. The compound according to claim 1, wherein Y is

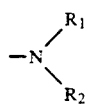

in which $R_1$ and $R_2$ are as defined in claim 1.

5. The compound according to claim 4, wherein one of $R_1$ and $R_2$ is hydrogen, methyl or ethyl, and the other is phenyl substituted once or twice by alkyl having 1 to 4 carbon atoms, alkoxy having 1 to 4 carbon atoms, carboxy or halogeno.

6. The compound according to claim 1, which is represented by the following formula in the free acid form,

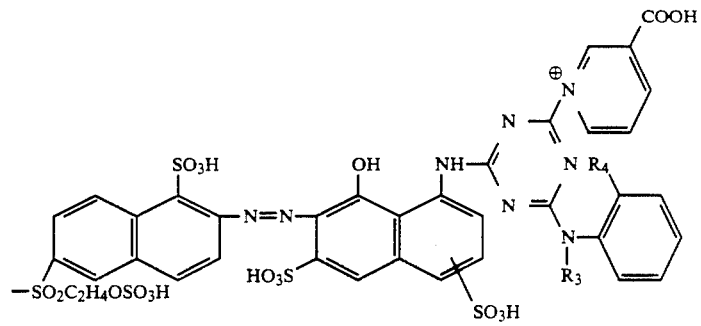

wherein $R_3$ is hydrogen, methyl or ethyl, and $R_4$ is chloro, bromo or methyl.

7. The compound according claim 6, which is represented by the following formula in the free acid form,

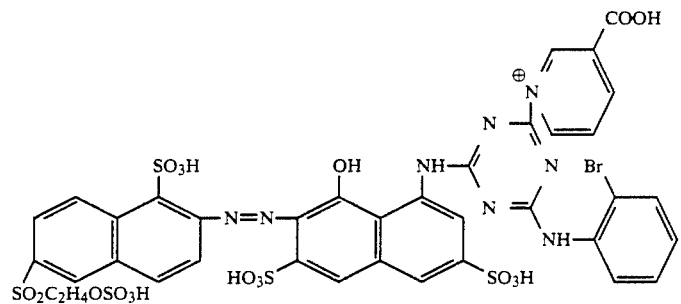

* * * * *